(12) United States Patent
Soelch et al.

(10) Patent No.: US 11,841,048 B1
(45) Date of Patent: Dec. 12, 2023

(54) BEARING AND BEARING LINER

(71) Applicant: New Hampshire Ball Bearings, Inc., Peterborough, NH (US)

(72) Inventors: Richard R. Soelch, Alton Bay, NH (US); Brandyn Duane Lewis, Canterbury, NH (US); Grant A. Drew, Sanbornton, NH (US)

(73) Assignee: New Hampshire Ball Bearing, Inc., Peterborough, NH (US)

( * ) Notice: Subject to any disclaimer, the term of this patent is extended or adjusted under 35 U.S.C. 154(b) by 0 days.

(21) Appl. No.: 18/151,111

(22) Filed: Jan. 6, 2023

(51) Int. Cl.
| | |
|---|---|
| *F16C 33/12* | (2006.01) |
| *C10M 107/38* | (2006.01) |
| *C10M 147/02* | (2006.01) |
| *C08K 7/14* | (2006.01) |
| *C08L 39/04* | (2006.01) |
| *C08K 7/06* | (2006.01) |
| *B32B 5/02* | (2006.01) |
| *B32B 7/12* | (2006.01) |
| *C08J 5/24* | (2006.01) |
| *C10N 40/02* | (2006.01) |

(52) U.S. Cl.
CPC .............. *F16C 33/121* (2013.01); *B32B 5/02* (2013.01); *B32B 7/12* (2013.01); *C08J 5/249* (2021.05); *C08K 7/06* (2013.01); *C08K 7/14* (2013.01); *C08L 39/04* (2013.01); *C10M 107/38* (2013.01); *C10M 147/02* (2013.01); *F16C 33/125* (2013.01); *C10M 2213/062* (2013.01); *C10N 2040/02* (2013.01); *F16C 2208/04* (2013.01); *F16C 2208/72* (2013.01)

(58) Field of Classification Search
CPC ...... B32B 5/02; C08J 5/249; Y10T 29/49655; F16C 2208/02; F16C 2208/04; F16C 2208/30; F16C 2208/32; F16C 33/121; F16C 33/125; F16C 33/20; F16C 33/201; F16C 33/203; F16C 33/205; F16C 33/206
See application file for complete search history.

(56) References Cited

U.S. PATENT DOCUMENTS 3,594,049 A * 7/1971 Turner ................. F16C 33/201
                                                                                              29/898.047
3,950,599 A    4/1976 Board, Jr.
(Continued)

FOREIGN PATENT DOCUMENTS

JP    2007270130 A    10/2007
JP    2016056308 A     4/2016

OTHER PUBLICATIONS

EI-10119-Pyralux-LF-SA-Data-Sheet.
(Continued)

*Primary Examiner* — Kregg T Brooks
(74) *Attorney, Agent, or Firm* — Grossman, Tucker, Perreault & Pfleger, PLLC

(57) ABSTRACT

The present invention is directed at products and methods related to the manufacture of a bearing with a bearing liner and the bearing liner on its own. The bearing liner within the bearing includes a fabric with a bonding side polymerized resin composition dispensed on one side and a sliding side polymerized resin composition disposed on a second side that contains dispersed lubricant. The liner preparation also offers the ability for the liner to conform to a selected bearing surface.

11 Claims, 8 Drawing Sheets

(56) References Cited

U.S. PATENT DOCUMENTS

| | | | |
|---|---|---|---|
| 4,079,490 A | * | 3/1978 | McCloskey ........... F16C 33/201 29/898.047 |
| 4,134,842 A | | 1/1979 | Orkin et al. |
| 4,224,425 A | | 9/1980 | Buergle et al. |
| 6,093,485 A | | 7/2000 | Jaffee |
| 10,184,520 B2 | | 1/2019 | Drew et al. |
| 2016/0348720 A1 | | 12/2016 | Drew et al. |

OTHER PUBLICATIONS

Sartomer USA, LLC. Material Safety Data Sheet.
SR368 Sartomer Technical Data Sheet.
SR368D Sartomer Technical Data Sheet.

* cited by examiner

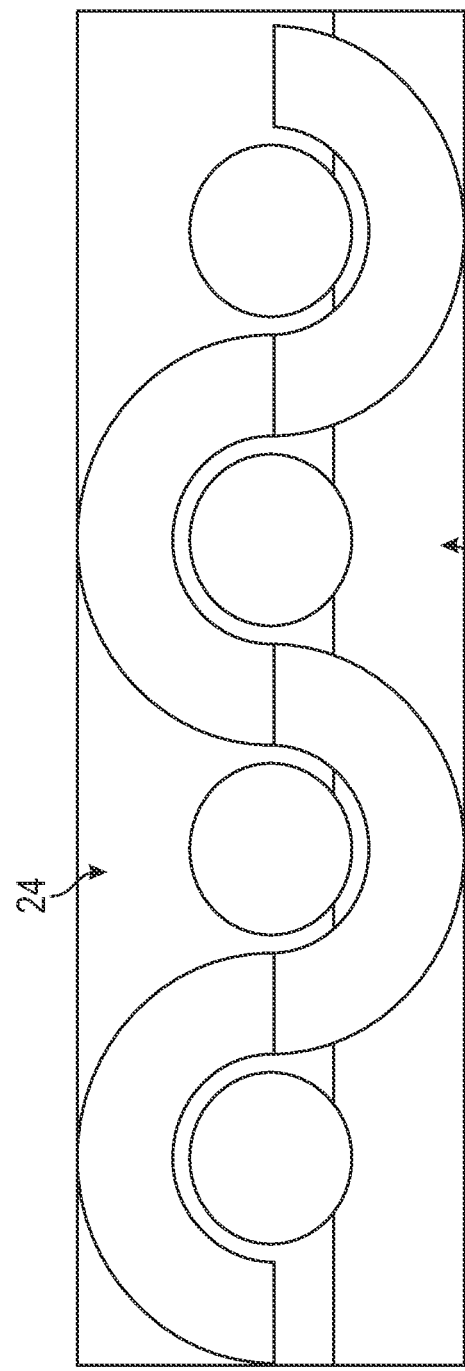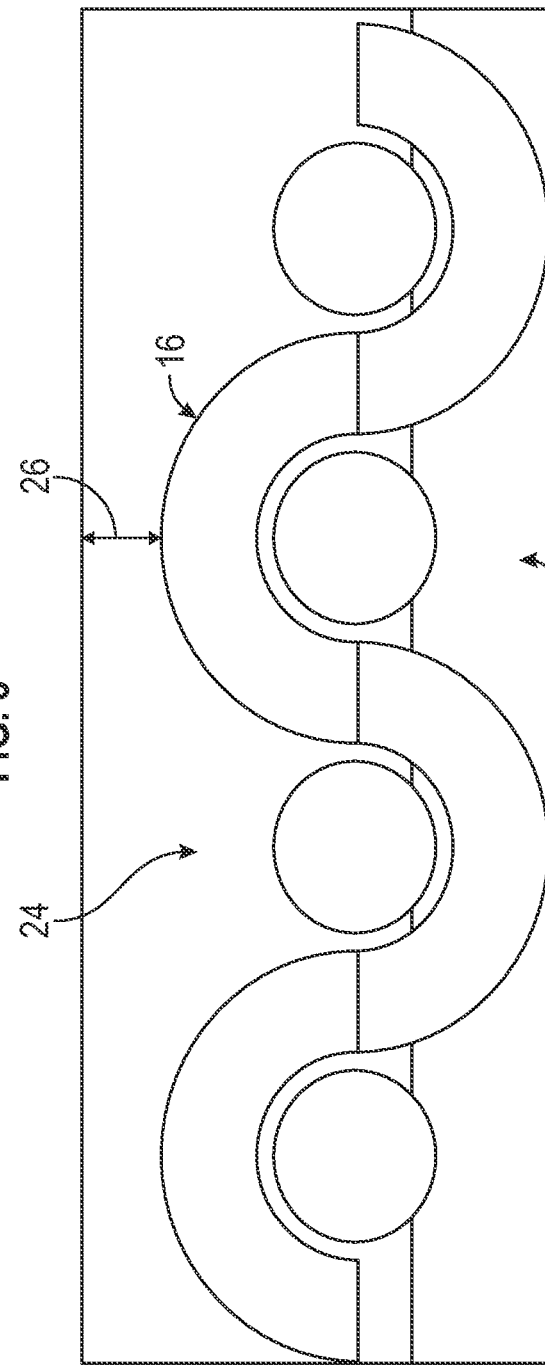

BEARING AND BEARING LINER

FIELD

The present invention is directed at products and methods related to the manufacture of a bearing with a bearing liner and the bearing liner on its own. The bearing liner within the bearing includes a fabric with a bonding side polymerized resin composition dispensed on one side and a sliding side polymerized resin composition disposed on a second side that contains dispersed lubricant. The liner preparation also offers the ability for the liner to conform to a selected bearing surface.

BACKGROUND

The prior art includes various disclosures directed at bearing liners, with the goal to decrease friction and liner wear over the extended lifetime of the bearing. In particular, the goal is to reduce the level of liner wear and the levels of rotational torque that may be observed over the lifetime of the bearing, namely at relatively high oscillation cycles. In addition, the goal has been to reduce the initial rotating torque (i.e. friction) at zero cycles of wear at the start of rotation in order to reduce the relatively long break-in periods characterized by relatively high initial rotating torque. Bearing wear tests include SAE Standard AS81934 Wear Tests and AS81934 Rotational Torque evaluations.

SUMMARY

A bearing including a liner comprising a woven or nonwoven fabric having a first bonding side containing a first bonding side resin composition including polymerized resin and a second sliding side having a second sliding side resin composition including polymerized resin and one or more dispersed lubricants.

A bearing liner comprising a woven or nonwoven fabric having a first bonding side containing a first bonding side resin composition including partially polymerized resin and a second sliding side having a second sliding side resin composition including partially polymerized resin and one or more dispersed lubricants. The liner with the partially cured polymerized resin on both the bonding side and sliding side may then be engaged and conformed to a bearing surface and fully polymerized.

A method for providing a bearing liner or bearing comprising providing a woven or nonwoven fabric having a first side and a second side, coating a first bonding side of the fabric with a first bonding side resin composition containing polymerizable resin and partially polymerizing. This is followed by coating a second sliding side of the fabric with a second sliding side resin composition containing polymerizable resin and one or more lubricants and partially polymerizing. This order of coating and partial polymerization may be reversed. The liner so produced may then be engaged to a bearing surface requiring a bearing liner and fully polymerized.

A method for providing a bearing liner or bearing comprising providing a woven or nonwoven fabric having a first side and a second side and coating a first side of the fabric with a first bonding side resin composition containing UV polymerizable resin and partially polymerizing. This is then followed by coating a second side of the fabric with a second sliding side resin composition containing UV polymerizable resin and one or more lubricants and partially polymerizing. This order of coating and partial polymerization may be reversed. The liner so produced may then be engaged to a bearing surface requiring a bearing liner and fully polymerized.

BRIEF DESCRIPTION OF THE DRAWINGS

FIG. 5 shows another cross-sectional illustration of a preferred example of the fabric sliding bearing liner, wherein there is now a greater relative volume of the 2SSRC (24) to the 1BSRC (22).

FIG. 6 is another cross-sectional illustration of a preferred example of a fabric sliding bearing liner, where the 2SSRC (24) rises a distance above the fabric warp fibers 16 as illustrated at 26.

FIG. 13A identifies the rotational torque over the first 25,000 cycles, FIG. 13B identifies the rotational torque over the entire 100,000 cycle test.

DETAILED DESCRIPTION OF THE PREFERRED EMBODIMENTS

The present invention is directed at products and methods related to a bearing with a bearing liner and the bearing liner on its own. The bearing liner contains a fabric with a bonding side polymerizable resin composition dispensed on and within one side and a sliding side polymerizable resin composition disposed on and within a second side. Preferably, the sliding side polymerizable resin composition includes at least one additive such as a lubricant which lubricant is not present in the bonding side composition. The lubricant is preferably dispersed in the sliding side polymerizable resin composition, and most preferably, uniformly dispersed. Reference to the feature that the lubricant is dispersed in the sliding side resin composition is reference to the feature that the lubricant is present within the sliding side polymerized resin composition. Accordingly, the dispersed lubricant can continue to be available on the surface of the sliding side resin composition as the sliding side composition is subject to surface wear.

The fabric itself can preferably be either nonwoven or woven, and preferably permeable, to initially allow for the bonding side polymerizable resin composition and/or sliding side polymerizable resin composition to impregnate a portion of the fabric and initially undergo a partial polymerization.

Figure 1:
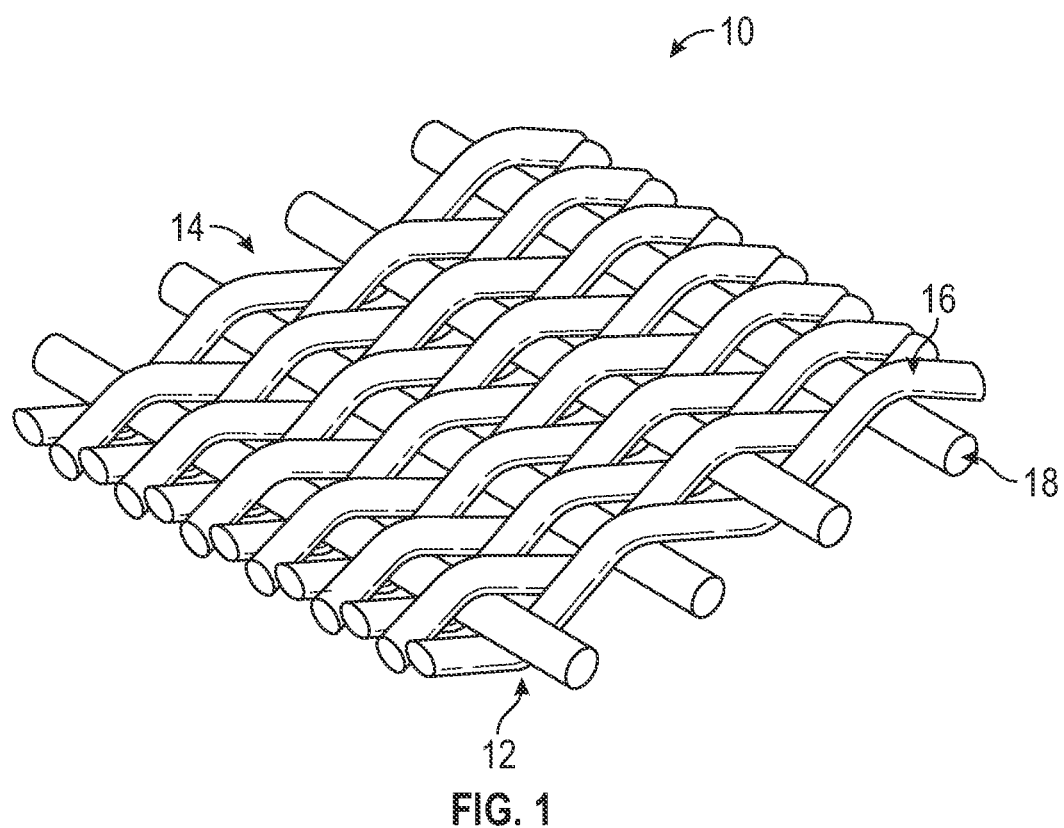
FIG. 1 is an illustration of a plain weave bearing liner fabric that provides a first bonding side for engagement with a bearing and a second sliding side.

FIG. 1 is an illustration of one preferred permeable plain weave fabric 10 that provides herein a first bonding side 12 and a second sliding side 14. That is, first bonding side 12 is configured to receive a bonding side polymerizable resin composition and the second sliding side is configured to receive a sliding side polymerizable composition, preferably including lubricant, as described further herein.

The fabric so selected has an initial and measurable air permeability that is a property of the whole fabric. Preferred levels of the initial airflow permeability are discussed further herein.

Figure 2:
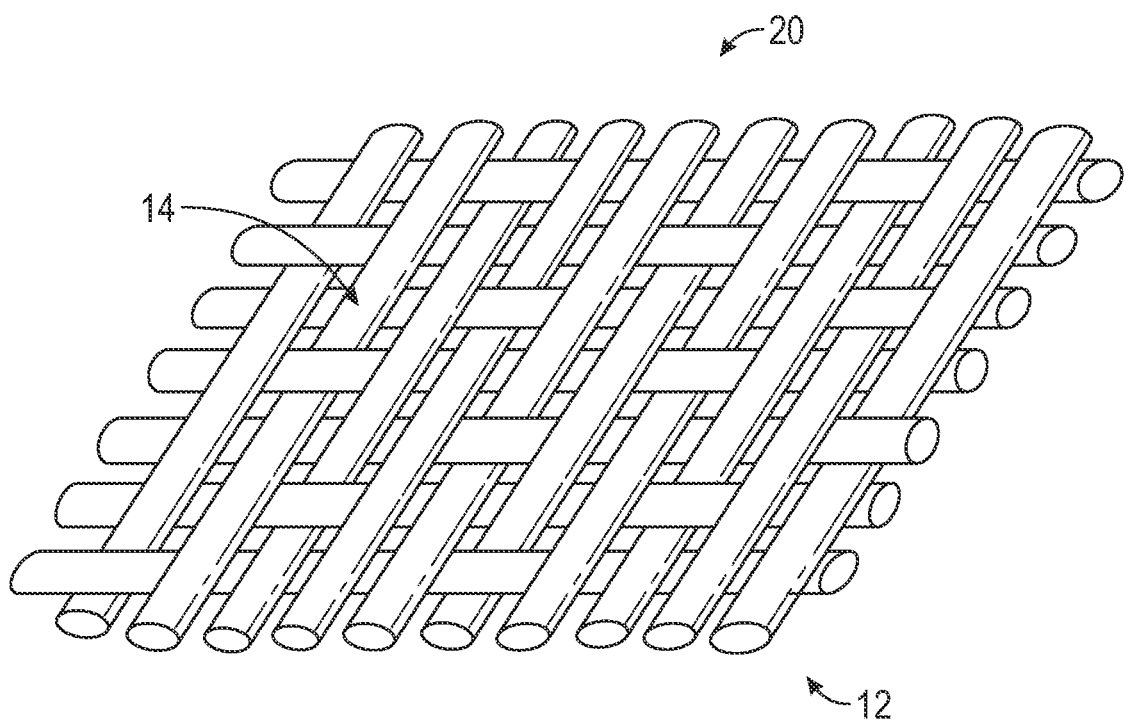
FIG. 2 provides another illustration of a bearing liner fabric that provides a first bonding side for engagement with a bearing and a second sliding side.

FIG. 2 provides an illustration of another preferred fabric 20 that again includes a first bonding side 12 and a second sliding side 14 for ultimate engagement with a bearing and then configured as a bearing liner. What is illustrated in FIG. 2 is also sometimes identified as a satin weave. In this situation, the bonding side 12 and sliding side 14 of the fabric itself can provide different surface features with respect to the introduction of the bonding side polymerizable resin or sliding side polymerizable resin.

The fabrics herein for the bearing liner (woven or nonwoven) are preferably comprised of fibers sourced from fiber-forming polymers. Such may preferably include aromatic polyamides (e.g., Nomex® and/or Kevlar®), polyimides, nylons or aliphatic polyamides, polyesters (e.g. PET), polyacrylates, polyethylene, glass, carbon fibers, polyamideimides, polyetherketones, polyphenylene sulfides, polypropylene, polyphenylene sulfide, and/or polybenzimidazoles. One particular preferred fabric is HT-527 available from Stern and Stern Industries, which is composed of polyaramid fibers and polytetrafluroethylene fibers.

The fabric herein for the bearing liner preferably has a thickness in the range of 0.005 inches to 0.030 inches, including all individual values and increments therein, at a basis weight of 5.0 grams/ft$^2$ to 70 grams/ft$^2$, including all individual values and increments therein. The fabric for the bearing liner also preferably has a permeability as determined by airflow in the range of 1.0 cubic feet per meter (cfm) to 1500 CFM, including all individual values and increments therein, as measured according to ASTM D737 (2018) (*Standard Test Method For Air Permeability Of Textile Fabrics*).

Figure 3:
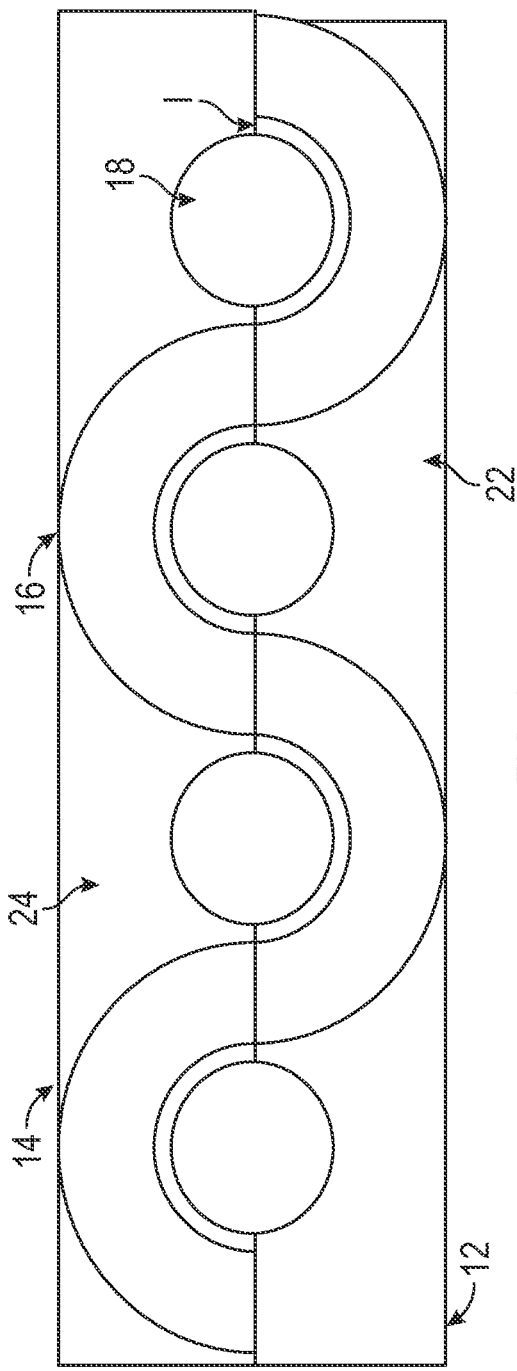
FIG. 3 is a cross sectional illustration of one example of the fabric sliding bearing liner.

FIG. 3 is a cross sectional illustration of one example of the fabric sliding bearing liner. The fabric sliding bearing liner is now illustrated in an end-on view with the weft fibers 18 and the warp fibers 16. The first bonding side 12 contains the first bonding side resin composition (1BSRC) containing polymerizable resin and is shown at 22. The 1BSRC may more preferably penetrate into and even more preferably encapsulates the bonding side of fabric (i.e. the side of the liner that ultimately bonds to a selected bearing surface).

The second sliding side 14 containing the second sliding side composition (2SSRC) containing polymerizable resin is shown at 24. The 2SSRC preferably penetrates into and even more preferably encapsulates the second sliding side of the fabric (i.e. the side of the liner that becomes frictionally engaged to an opposing surface).

In this non-limiting illustration provided in FIG. 3, the volumes of the 1BSRC and 2SSRC appear to be about equal. In practice it can also be preferable to provide a greater or lesser relative volume of either one or the other of the 1BSRC or 2SSRC or it may be desirable to have greater or lesser volume of both the 1BSRC or 2SSRC, simultaneously. Accordingly, the fibers 16 and/or 18 may also preferably protrude above the surface of either the 1BSRC or 2SSRC or both of the 1BSRC or 2SSRC. Conversely, the fabric fibers 16 and/or 18 may preferably be below the surface of either 1BSRC or 2SSRC, or below the surface of both 1BSRC and 2SSRC.

It is therefore now worth noting that the fabric herein (e.g., 10 or 20 in FIGS. 1 and 2, respectively) may optionally be treated before coating to enhance adhesion of 1BSRC and 2SSRC. Such treatment may preferably include chemical treatment while other fabric treatment procedures may include application of ionizing energy or plasma treatments to the fabric fibers 16 and/or 18 just prior to coating with 1BSRC and 2SSRC.

In addition, it is preferable to select fabric for the bearing liner according to the measurement of an initial airflow through the fabric. Preferably, airflow through the fabric herein is measured according to ASTM D737 (2018). Accordingly, the airflow through the fabric is preferably selected herein to be at or below 100 cfm or in the range of 1 cfm to 100 cfm including all values and increment therein. Accordingly, the airflow through the fabric may be in the range of 1 cfm to 90 cfm, 1 cfm to 80 cfm, 1 cfm to 70 cfm, 1 cfm to 60 cfm, 1 cfm to 50 cfm, 1 cfm to 40 cfm, 1 cfm to 30 cfm, 1 cfm to 20 cfm, or 1 cfm to 10 cfm. What follows then is that in those situations where either the 1BSRC or the 2SSRC are selected to contain an additive such as a fibrous filler, when applying such fiber-containing resin compositions into the surface of the fabric 10 or 20 (FIGS. 1-2), and by selecting at airflow in the relatively lower part of the above referenced range (e.g., 1 cfm to 50 cfm or more preferably 1 cfm to 25 cfm) the fibrous filler can be relatively constrained from passing through the full thickness of the fabric and then depositing on the opposite surface. Therefore, such fibrous fillers can now preferably deposit and accumulate with a relatively greater concentration at or near the surface of the fabric where they are introduced without passing through the full thickness of the fabric and onto the fabric's opposite side surface. In other words, the fibrous filler can be made to be present only within the 1BSRC and not in the 2SSRC.

Accordingly, by selecting a relatively low airflow for the fabric herein (e.g., 1 cfm to 50 cfm) one may now preferably and selectively locate, e.g., fiberglass type fibers at or near the surface of the fabric liner within the 1BSRC. Or, by selecting a relatively higher airflow (e.g. greater than 50 cfm to 100 cfm) one may more evenly disperse fillers throughout the fabric liner side that is to be impregnated with such fillers and the 1BSRC to promote bonding and strength of the fabric liner when bonded to a given bearing surface, without adversely impacting the frictional characteristics of the 2SSRC.

One may now also selectively include fluorocarbon-based fibers (e.g., PTFE fibers) in the 2SSRC and then, with a fabric with a relatively low airflow, preferably concentrate such fluorocarbon-based fibers at or near the surface of the sliding side of the fabric. Or again, by selecting fabric with a relatively higher airflow, more evenly disperse such PTFE filler in the liner side containing the 2SSRC. Such fluorocarbon fibers can then serve to reduce friction. Reference herein to preferably and selectively locating any fibers at or near the surface is contemplated to be locating the fibers at the surface of the 2SSRC or down to a thickness of 0.010". In addition, it is therefore now possible to selectively locate fluorocarbon-based fibers only within the 2SSRC and not in the 1BSRC.

Moreover, it can now be generally appreciated that the present invention provides for the ability to include in the 2SSRC additives that will selectively penetrate the fabric liner which additives can promote increases in wear resistance and maintain relatively low friction for the 2SSRC when employed in a given bearing application. Similarly, one may include in the 1BSRC those additives which will tend to increase the bonding characteristics and strength of the 1BSRC, such as fiberglass fibers, when bonding to a given surface to then serve as a bearing liner.

Accordingly, the fabric liner herein containing warp fibers 16 and weft fibers 18, can now be produced with a 1BSRC and a 2SSRC (see again items 22 and 24 in FIG. 3), which can be made to differ in compositional characteristics due to the presence of different selected additives. The fabric liner then uniquely achieves differences in the fabric surface characteristics on each respective side of the single fabric liner, such as enhanced wear resistance, strength, and stiffness, when the fabric liner is utilized as a bearing liner. Reference to a difference in compositional characteristics is reference to the feature that there is a difference in the presence of at least one or more ingredients as between the 1BSRC and the 2SSRC.

The first bonding side resin composition (1BSRC) and the second sliding side resin composition (2SSRC) herein preferably contain a polymerizable resin. Preferably, the 1BSRC and the 2SSRC are first partially cured or partially polymerized, which may be accomplished by exposure to heat and/or UV light. The partial polymerization provides a single liner that remains sufficiently flexible and conformable to be applied to a given surface requiring a bearing liner. Preferably the partial polymerization of the polymerizable resin in the 1BSRC and in the 2SSRC is such that the fabric liner remains sufficiently flexible to then conform and position within, e.g., the inner diameter of a 0.375 inch inner diameter bore. That is, the fabric liner conforms and is positioned within the inner diameter of such a bore, where the 1BSRC then contacts and engages (bonds or adheres) with the bore's inner diameter surface.

The partial polymerization herein is also preferably characterized in that the conversion (polymerization) of the monomeric resins initially present in the 1BSRC and/or 2SSRC is to a preferred level of at least 50.0% and more preferably in the range of 50.0% to 99.0%, including all individual values and increments therein. One contemplated technique to distinguish between partial polymerization or cure and full polymerization or cure is Dynamic Mechanical Analysis (DMA) which can measure the modulus of the liner. More specifically, the modulus will increase at full polymerization or cure (e.g., where the highest degree of crosslinking occurs in the case of thermosets). Accordingly, DMA of a fully polymerized or full cured sample can be readily established and compared to the DMA of a given sample to identify whether the sample is partially polymerized or partially cured or fully polymerized or fully cured. In addition, as noted partial polymerization or cure is also confirmed by the feature that the liner remains sufficiently flexible to then conform and position within, e.g., the inner diameter of a 0.375 inch inner diameter bore.

The partial polymerization may also be separately characterized by the feature that that there is a relatively low amount of transferable liquid now present in the liner that would be absorbed when in contact with a 4.0 inch square of kraft paper after remaining in contact with such paper for a period of 24 hours. The kraft paper is Delta Paper Corp 3050KP. Preferably, the amount of such transferable resin in the 1BSRC and/or 2SSRC, after partial polymerization, is in the range of equal to or less than 20.0% by weight of the polymerizable resin that was initially present.

The polymerizable resin for the 1BSRC and/or the 2SSRC is preferably selected from one or more of the following: monomeric resin, oligomeric resin, resin solutions, resins suspensions or resins dispersions, that will polymerize into a homopolymer or copolymer and includes those polymerizing resins that then ultimately provide either a thermoplastic and/or thermoset (crosslinked) material. Preferably, the polymerizing resins for the 1BSRC and/or the 2SSRC are those that will form one or more of the following polymers: poly(acrylates), phenolic resins, aromatic polyamides, epoxy resins, polyimides, poly(amide-imides), polyetherketones, polyetheretherktones, or polyesters. Preferably, the polymerizable resin is one that is capable of curing (polymerizing) upon exposure to UV light, which may occur in the presence of a UV polymerization initiator. The polymerization may also be initiated using thermal polymerization initiators, such as free-radical initiators, along with the introduction of heat.

One particularly preferred monomer composition for polymerization for the 1BSRC and/or the 2SSRC, is a mixture of tris(2-hydroxyethyl) isocyanurate triacrylate monomer (30% by weight) with trimethylolpropane triacrylate (70% by weight). Such monomer composition is preferably polymerized by UV light. A preferred initiator for UV polymerization includes a liquid photo initiator designated Speed Cure 4265, from Sartomer, which is identified as a liquid formulation with adsorption maxima at 240, 273 and 380 nm. Preferably, the UV polymerization initiator in the 1BSRC and/or 2SSRC is present at a level of 0.05 parts to 5.0 parts by weight per 100 parts by weight of the polymer resin in the 1BSRC or 2SSRC undergoing polymerization.

In the broader context of the present invention, the UV light sources that are preferred to initially promote partial curing (partial polymerization) and/or full curing of the polymer resin in the 1BSRC and/or 2SSRC include mercury vapor, LED, eximer lamps and electrodeless UV. Preferred power levels to promote such partial polymerization can vary in the range of 60 W/cm to 300 W/cm. A particularly preferred microwave powered UV bulb was provided by Heraeus under the designation F300S. The UV bulb has power primarily concentrated around 410-420 nm wavelengths. UV exposure time to promote partial polymerization in the 1BSRC and/or 2SSRC preferably falls in the range of about 1-3 seconds (machine direction length of microwave powered UV lamp in ft (measured at tungsten screen) divided by the conveyor belt speed in feet/second). The energy transmitted as measured by an EIT Uvicure Power Puck II passed through the UV conveyor system preferably ranges from about: 0.1-0.5 J/cm² (UVA); 0.05-0.5 J/cm² (UVB); 0.010-00.100 J/cm² UVC; and 0.5-5.0 J/cm² (UVV). The preferred level of UV initiator to promote such initial partial polymerization in the 1BSRC or 2SSRC is in the range of 0.05-5.0 parts per 100 parts by weight of the resin to be partially polymerized.

Accordingly, it can be appreciated that the 1BSRC or 2SSRC may contain the same polymerizable resin or a different polymerizable resin for undergoing polymerization. Preferably, it is useful to select the same polymerizable resin for the 1BSRC and 2SSRC as this will tend to maximize relatively improved bonding and adhesion at the interface "I" (see FIG. 3) location between the 1BSRC and 2SSRC.

Preferably, the 1BSRC and 2SSRC are compositionally different with respect to their additives (ingredients other than the polymerizable resin). For example, preferably, the 2SSRC includes one or more lubricant additives which lubricant additive(s) are not present in the 1BSRC and which lubricant is designed to reduce the frictional characteristics of the 2SSRC. Preferably, the 1BSRC includes fiberglass filler, to increase the bonding strength to a given bearing surface, which fiberglass filler is not present in the 2SSRC.

The lubricant additive(s) may preferably be selected from fibrous and/or particulate lubricants to reduce the friction as between the 2SSRC and the surface to which it may be frictionally engaged when positioned as a liner in a bearing application. Preferred lubricants therefore include one or more of the following: fibrous or particulate polytetrafluoroethylene, perfluoropolyethers, graphite, polyaramide fibers, molybdenum disulfide, hexagonal boron nitride, and graphene. Preferred lubricant additives can also include lubricating oils. Preferably, the level of any such lubricant in the 2SSRC is 1.0% (wt) to 60.0% (wt), including all individual values and ranges therein, and more preferably 25.0% (wt.) to 55.0% (wt.), including all individual values and ranges therein.

A particularly preferred lubricant in the 2SSRC is the combination of polytetrafluroethylene (PTFE) powder-based lubricant available from Chemours under the name ZONYL™ with a perfluropolyether (PFPE) oil that is available from Chermours under the name Krytox GPL105. Perfluoropolyether is reference to a polymer chain containing perfluro-alkyl groups joined by ether linkages. ZONYL™ is identified at a solid particulate PTFE lubricant including average particle sizes (volume based) in the range of 2 μm to 20 μm. As noted above, the PTFE particulate-based lubricant in combination with the PFPE lubricant oil may preferably be present in the 2SSRC at a level of 1.0% (wt.) to 60.0% (wt.). However, in one particularly preferred lubricant combination, the PTFE particulate is preferably present in the 2SSRC at 15.0% (wt.) to 22.0% (wt.) and the PFPE lubricating oil is preferably present in the 2SSRC at a level of 25.0% (wt.) to 33.0% (wt.).

With regards to the 1BSRC, as noted, this composition includes polymerizable resin and preferably, additives that optimize the strength and bonding characteristics. Accordingly, the polymerizable resin preferably includes one or more of the following: UV initiators, thermal initiators, fibers (chopped or milled), such as glass fibers and/or carbon fibers, and particulate additives, such as clays, titanium dioxide, inorganic silicates, colorants, and stabilizers such as antioxidants and heat stabilizers. When fibers are present, the fibers are preferably present in the 1BSRC in the range of 2.0% (wt.) to 40.0% (wt.) including all individual values and increments therein. Such fibers preferably have a diameter in the range of 10.0 microns to 25.0 microns and length of 175 microns to 250 microns. More preferably, one may utilize milled fiberglass which has a diameter of 15.0 microns to 17.0 microns and has a length of 200 microns to 225 microns. One particular preferred fiber is available from Fibertec under the name Microglass 9132, which is identified as microglass milled fibers (E-glass filaments) having a fiber diameter of 16.0 microns, a fiber length of 220 microns, a bulk density of 0.78 g/cc +/−0.08 g/cc, that is silanated for enhancing adhesion to the polymerized resin in the bonding side resin.

Figure 4:
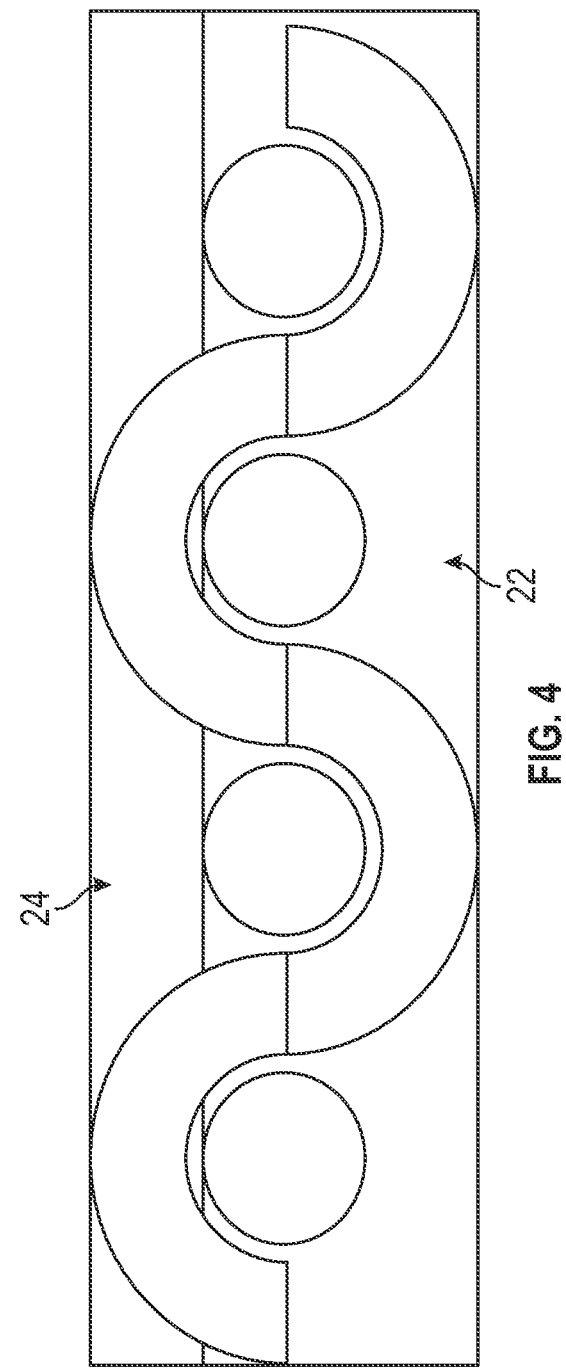
FIG. 4 shows another cross-sectional illustration of a preferred example of the fabric sliding bearing liner, where there is a relatively greater volume of the 1BSRC (22) relative to the 2SSRC (24).

Attention is next directed to FIG. 4 which shows another cross-sectional illustration of a preferred example of the fabric sliding bearing liner, where there is a relatively greater volume of the 1BSRC (22) relative to the 2SSRC (24).

Attention is next directed to FIG. 5 which shows another cross-sectional illustration of a preferred example of the fabric sliding bearing liner, wherein there is now a greater relative volume of the 2SSRC (24) to the 1BSRC (22).

FIG. 6 is another cross-sectional illustration of a preferred example of a fabric sliding bearing liner, where the 2SSRC (24) rises a distance above the fabric warp fibers 16 as illustrated at 26. Such rise of the 2SSRC (24) above the warp fibers 16 may preferably fall in the range of 0.0005-0.005 inches, including all individual values and increments therein. It may therefore be appreciated that the 1BSRC (22) may similarly rise beyond the warp fibers 16 in the range of 0.0005 to 0.005 inches, including all individual values and increments therein. Or, the 1BSRC (22) and/or the 2SSRC (24) may each fall a distance below the fabric warp fibers 16. Such distance may preferably be in the range 0.0005 inches to 0.005 inches.

Figure 7:
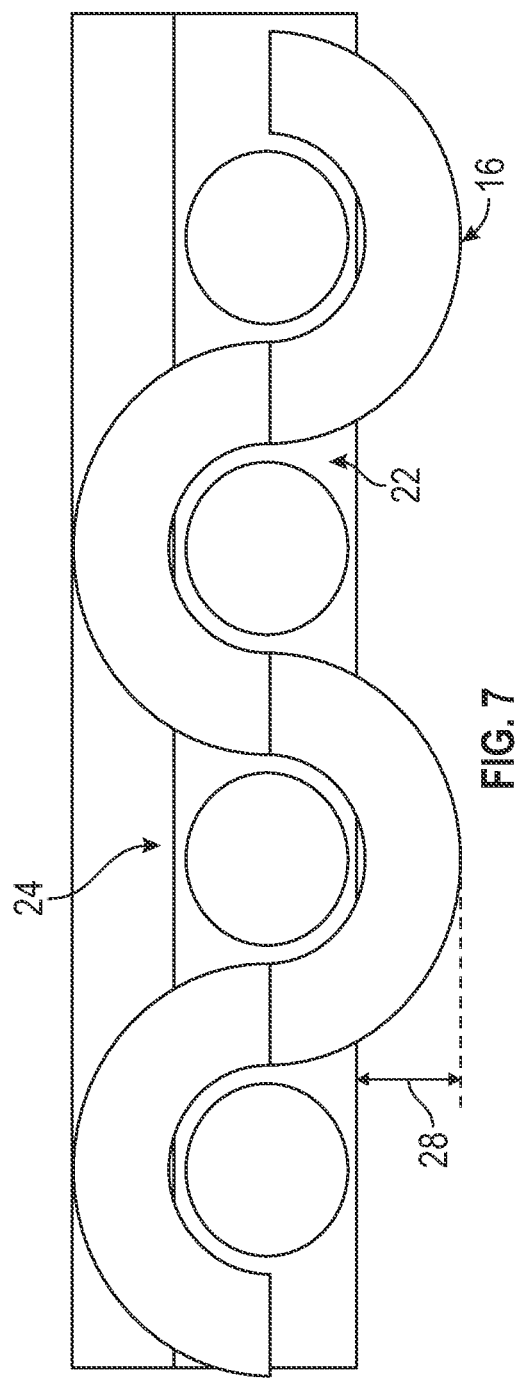
FIG. 7 is another cross-sectional illustration of a preferred example of a fabric sliding bearing liner wherein the weft fibers 16 protrude from the 1BSRC (22) as shown by arrow 28.

FIG. 7 is another cross-sectional illustration of a preferred example of a fabric sliding bearing liner wherein the warp fibers 16 protrude from the 1BSRC (22) as shown by arrow 28. Such protrusion distance may preferably fall in the range of 0.0005 inches 0.005 inches. It can be readily appreciated that the warp fibers 16 may also be configured to protrude a distance above the 2SSRC (24), which distance may also preferably be 0.0005 inches to 0.005 inches.

Accordingly, it may now be appreciated that the outer surfaces of the fabric liner herein, which is reference to the surface of the fibers used to form the fabric liner, can be filled flush or even with 1BSRC (22) and 2SSRC (24) as illustrated in FIG. 3, underfilled as shown in FIG. 7 (wherein e.g., the fibers 16 protrude beyond the 1BSRC (22)) or overfilled as shown in FIG. 6 (wherein e.g., the fibers 16 are encapsulated within and beneath the surface of the 2SSRC (24)). Moreover, the relative volume of the 1BSRC (22) and the 2SSRC (24) may be the same (FIG. 3) or different (FIG. 4).

Figure 14:
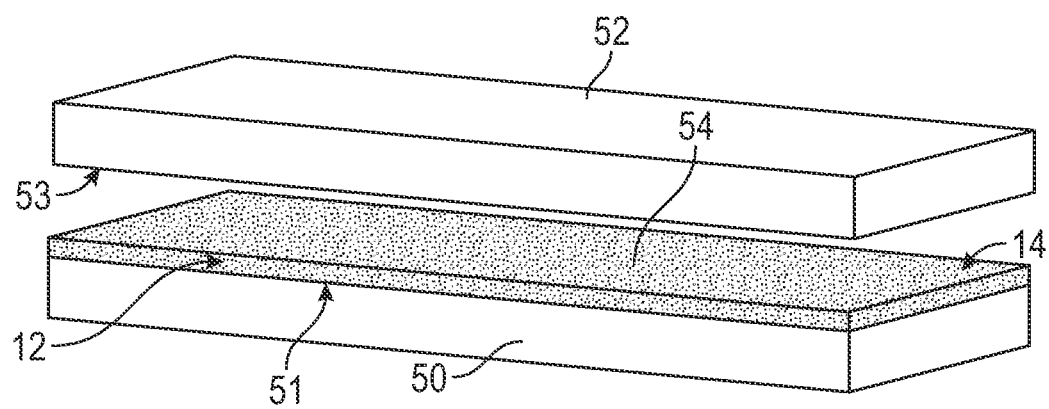
FIG. 14 illustrates a bearing having a first member 50 having a surface 51 and a second member 52 having a surface 53 that are configured to be in sliding contact. The fabric sliding bearing liner 54 described herein is located between the first member 50 and second member 52.

The fabric sliding bearing liner described herein is applied to a bearing surface. With attention to FIG. 14, reference to a bearing herein is reference to any component that contains a first member 50 having a surface 51 and a second member 52 having a surface 53 that are configured to be in sliding contact. The fabric sliding bearing liner 54 described herein is located between the first member 50 and second member 52. The first bonding side of the bearing liner 54 is again identified at 12 containing the first bonding side resin composition (1BSRC) along with the second sliding side 14 containing the second sliding side resin composition (2SSRC).

Figure 15:
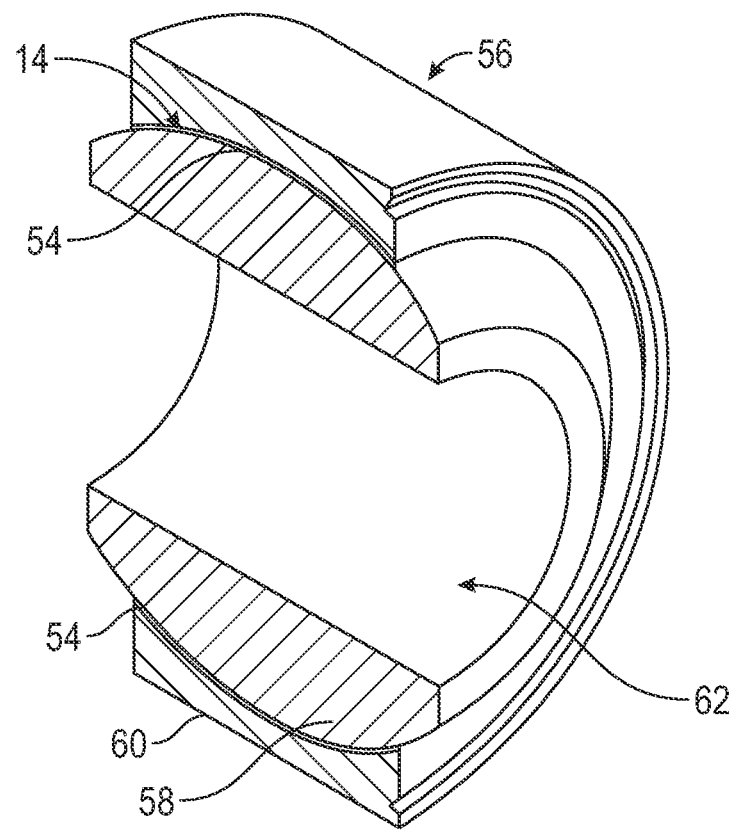
FIG. 15 provides in cross-sectional view an illustration of a common type of bearing of the present invention, specifically a rotating bearing containing the fabric sliding liner bearing 54 described herein.

FIG. 15 provides in cross-sectional view an illustration of one common type of bearing of the present invention, specifically a rotating bearing containing the fabric sliding liner bearing 54 described herein. A ball 58 of the bearing has a convex outer surface in sliding contact with the sliding side 14 of the liner 54 which contains the second sliding side resin composition (2SSRC). What is typically described as the race component is shown at 60 which is engaged to liner 54 via the first bonding side resin composition (1BSRC). The particular ball type bearing illustrated in FIG. 15 includes a bore opening 62 so that it can be placed onto a shaft or rod.

Working Example of Bearing Liner Preparation and Bearing Including the Bearing Liner Non-limiting formulations for a first bonding side resin composition 1BSRC and a second sliding side resin composition 2SSRC are shown in the tables below.

TABLE 1

First Bonding Side Resin Composition (1BSRC)

| Number | Component | Type | Weight % |
|---|---|---|---|
| 1 | SR368D | Acrylate | 83.3 |
| 2 | Speedcure 4265 | UV Initiator | 0.42 |
| 3 | Garamite 7305 | Thixotrope | 2.08 |
| 4 | Fibertech 9132 | Milled Glass | 14.2 |

TABLE 2

Second Sliding Side Resin Composition (2SSRC)

| Number | Component | Type T | Weight % |
|---|---|---|---|
| 1 | SR368D | Acrylate | 52.21 |
| 2 | Speedcure 4265 | UV Initiator | 0.26 |
| 3 | Garamite 7305 | Thixotrope | 0.52 |
| 5 | Zonyl | PTFE Powder | 18.8 |
| 6 | Krytox GPL 105 | PFPE Oil | 28.2 |

The numbered components are as follows:

1 SR368D: Tris (2-hydroxy ethyl) Isocyanurate Triacrylate, Sartomer USA, LLC Exton, Pa.

2. Speedcure 4265: UV Initiator supplied by Sartomer, Americas

3. Garamite 7305: A powdered rheology additive supplied by BYK-Chemie Gmbh, Wesel, Germany 4. Fibertec 9132: Milled fiberglass sold by Fibertec, Bridgewater, Ma, USA.

5. Zonyl MP1300: PTFE powder supplied by Fluorogistx, Greenville, De., USA

6. Krytox GPL105: Perfluoropolyether oil sold by Miller Stephenson Chemicals

The components for the 1BSRC were mixed in a Flacktek Speedmixer (Model DAC 150 FVZ) using industry standard mixing conditions. The components for 2SSRC mixed in a Flacktek Speedmixer (Model DAC 150 FVZ) using industry standard mixing conditions.

Figure 8:
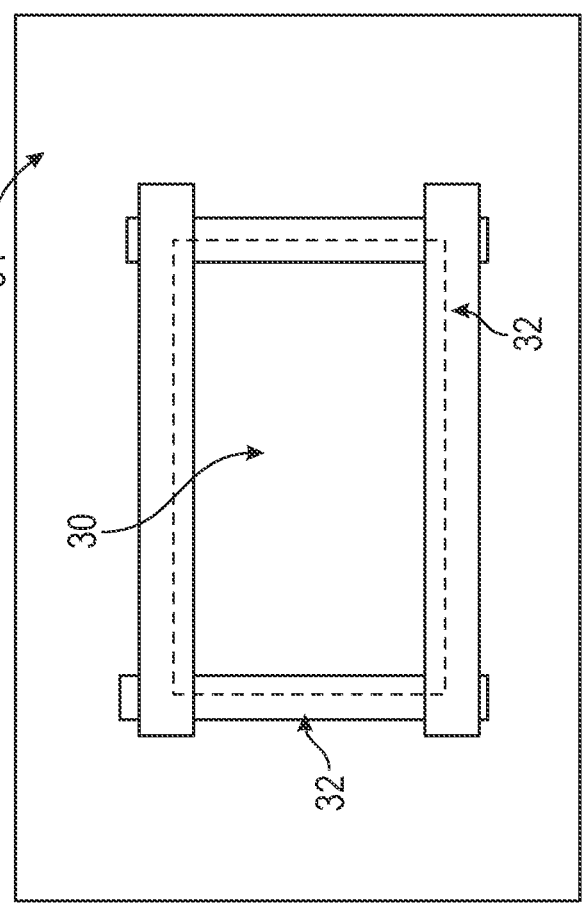
FIG. 8 is an illustration of a test fabric piece configured for application of the polymerizable resin of the 1BSRC.

The exemplary and non-limiting fabric chosen was HT-527 fabric purchased from Stern and Stern Industries and was cut approximately into 5 inch by 7 inch rectangular test pieces. This representative fabric is a woven fabric made from Nomex™ fibers and PTFE fibers and has a higher relative concentration PTFE on one side. The test fabric piece 30 (FIG. 8) was masked off with masking tape on the 5 inch wide ends of the rectangular test pieces such that a 1 inch section of width 5 inches long was covered with tape 32 on each side and end. The taped ended fabric piece was then placed on a much larger sheet of backing material 34 with the darker sliding side of HT-527 facing down against the backing material. The sliding side of the exemplary fabric included PTFE fiber. Thus the bonding side of HT-527 is exposed at this point. The lengthwise edges of the fabric were then taped down to the backing material. This tape sealed the fabric side edges such that 1BSRC would not contaminate the sliding side of the fabric through capillary action during subsequent coating. Any suitable inert backing material can be used.

Figure 9:
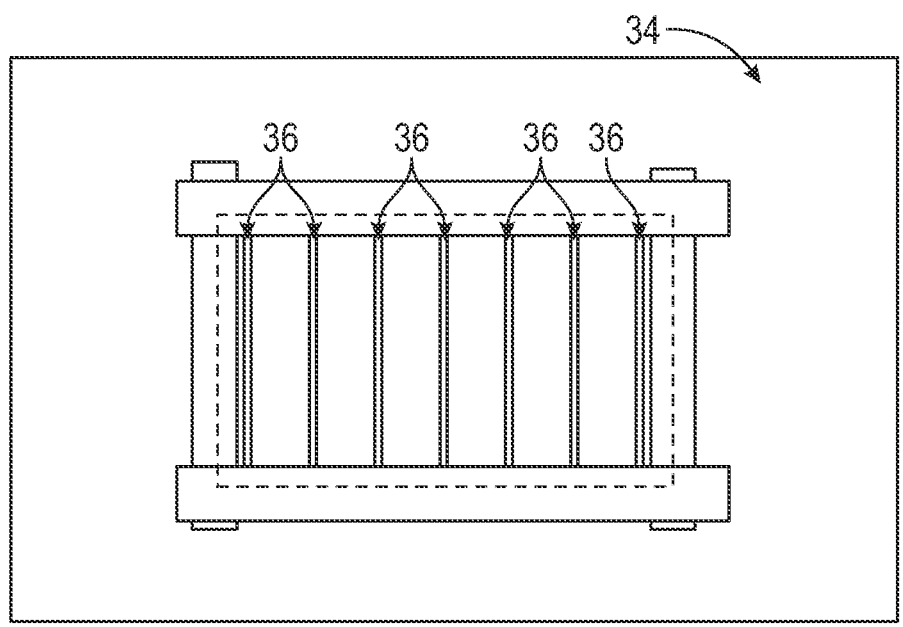
FIG. 9 illustrates one non-limiting example of the application of parallel beads of polymerizable rein of the 1BSCR to the test fabric piece.

Next a disposable polyethylene pipette with about a 0.080" wide opening was used to place 5.0 grams of parallel beads 36 of polymerizable resin of the 1BSRC in approximately 7 beads widthwise across the taped fabric. See FIG. 9. The beads were placed such that the first two were placed just onto the fabric adjacent to the 1 inch wide tape on the width ends, the next bead was placed in the middle across the width and then two more placed bisecting each half. Sometimes the bead width varied and more or less beads were added in order to use the entire 5.0 grams of polymerizable resin mix. Next a 5.5 inch wide rubber squeegee was used to spread the beads starting from one width along the taped edge and pulling the squeegee under about 5 lbs of hand down pressure at a relatively low angle (approximately 20-30 degrees) at a relatively slow hand speed until the opposite taped width edge was reached. The squeegee was then turned around and resin moved back in the opposite direction in the same manner. Next the squeegee was lifted and placed along the taped lengthwise edge and the resin spread again in a similar fashion. Finally, it was reversed again and spread back. The net result is that one typically uses 2 passes (one from one width side to the others width side and then back) and also 2 passes from one length side edge to the other and back. There was usually a small amount of resin left on the squeegee after this coating process which was subsequently discarded.

Figure 10:
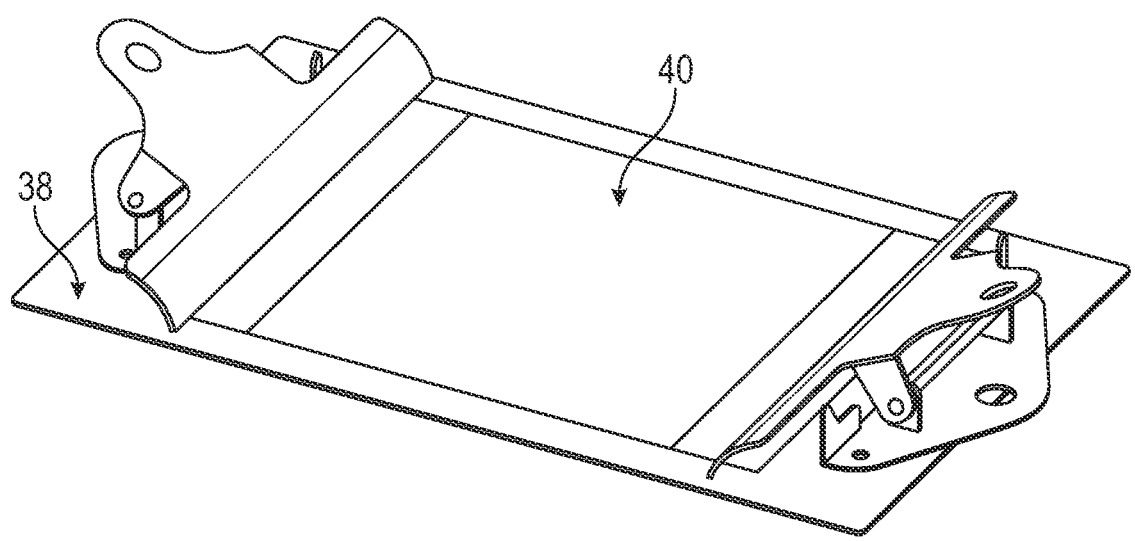
FIG. 10 illustrates one non-limiting example of the use of a clipboard fabric holder for holding the fabric liner and passing through a UV conveyor to promote partial polymerization of the applied 1BSRC or 2SSRC.

The fabric was then released from the backing material (aluminum foil in test examples) after first removing the tape along the lengths. Often, some weft fibers were pulled partly loose from the coated fabric sides when the tape was removed. Any loose edge fibers were then cut off with very sharp scissors. As illustrated in FIG. 10, a relatively small clipboard fabric holder 38 was employed that was 5 inches wide by about 8 inches long with clips on each end of its length (the clips were on one side of the clipboard so they could be used to clamp on each taped end of the now coated test fabric 40 with the 1BSRC. The clipboard mounted coated fabric assembly was then passed through a 6 inch wide Heraeus UV conveyor equipped with a V-Bulb, with the light source set at 1 3/8 inch focus height above its bottom position and the conveyor operating at about 20 ft/min, to promote partial polymerization.

The partially polymerized coated fabric was then immediately removed and the partially polymerized 1BSRC of the fabric was taped down against a clean piece of backing material (aluminum foil) as before, except this time the uncoated side of the HT527 is up. The 2SSRC was then coated by the same method previously used to coat the bonding side except that 2SSRC was used to coat what ultimately becomes the wear side of the fabric liner. After coating it was removed as before and placed with the 2SSRC facing up in the two-sided clipboard and put through the UV conveyor to promote partial polymerization of the 2SSRC.

The liner so produced was then removed from the clipboard. The edges were typically trimmed slightly with a guillotine cutter and the liner weighed and dimensions measure to allow calculating the percentage of resin and fabric in the liner. The bonding side was observed to have a relatively rough, relatively high friction texture due to the presence of relatively small protruding fiberglass ends whilst the sliding side was observed to have a relatively low friction surface texture.

Bearings for AS81934 testing were prepared according to standard methods with the above referenced liner containing the partially polymerized 1BSRC and 2SSRC versus a control, namely a bearing containing an X-1820 liner available from New Hampshire Ball Bearing. The 1BSRC surface of the liner of the invention was adhered to the bearing surface using Henkel Loctite® AA331 and the assembly then post cured at 340 F for 16 hours.

Figure 11:
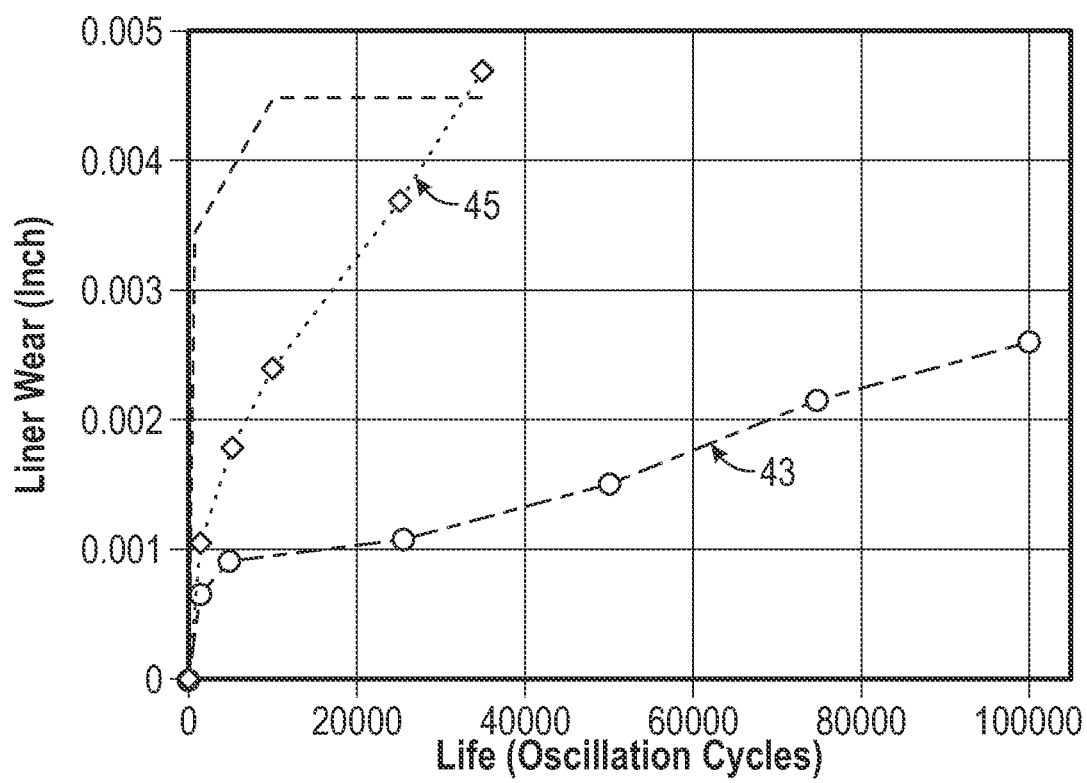
FIG. 11 illustrates a high pressure AS81934 Military Specification Sleeve Bearing wear test results for a commercial bearing (43) AHJ08C012(L1) with an X-1820 liner containing only PTFE fiber lubricant, compared with the same bearing (45) AHJ08C012(L1) with an X-1820 liner containing PTFE fiber lubricant and additionally containing vacuum impregnated perfluoropolyether oil Krytox GPL105.

As noted above, FIG. 11 illustrates a high pressure AS81934 Military Specification Sleeve Bearing wear test results for commercial bearing (43) AHJ08C012(L1) with the X-1820 liner containing only PTFE fiber lubricant, compared with the same bearing (45) AHJ08C012(L1) with the X-1820 liner containing PTFE fiber lubricant and additionally containing vacuum impregnated perfluoropolyether oil, namely Krytox GPL105 (as disclosed in U.S. Publication No. 20160348720A1). Bearing (45) prepared according to U.S. Publication No. 20160348720A1 containing PTFE and perfluoropolyether oil exceeded the 0.0045 inch wear limit of AS81934 before the 100,000 cycle required life, greatly exceeding the wear rate of the standard commercial bearing 43 with only PTFE fiber lubricant. Thus the prior art bearing (45) with the PTFE and perfluoropolyether oil lubricant combination made according U.S. Publication No. 20160348720A1 fails to meet high pressure Mil. Spec. Test Wear Requirements and has relatively inferior wear life compared with a PTFE fiber-only lubricated commercial bearing (43).

Figure 12:
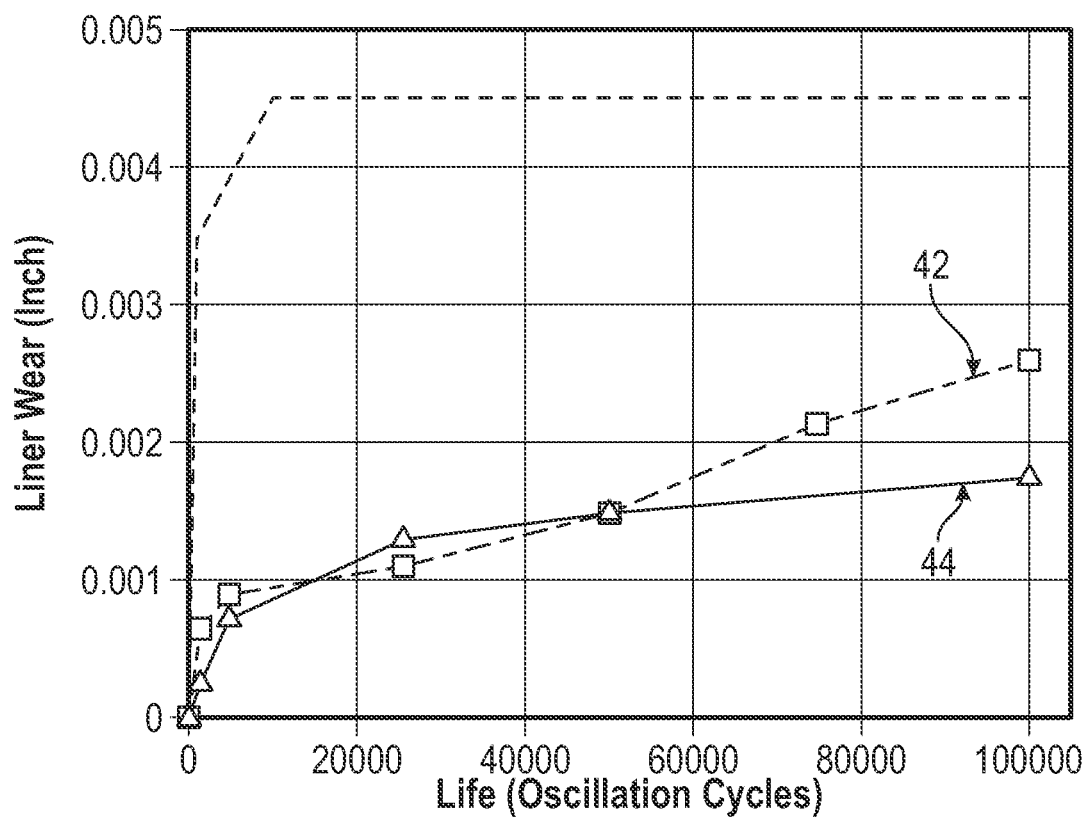
FIG. 12 shows the AS81934 Bearing wear test run at 37,500 psi nominal liner stress comparing wear for a commercial bushing lined with the above referenced X-1820 liner (see line 42) versus a bushing (44) lined with the fabric liner described herein containing the 1BSRC shown in Table 1 and the 2SSRC shown in Table 2.

FIG. 12 shows results from an AS81934 Bearing wear test run at 37,500 psi nominal liner stress comparing wear for a commercial bushing lined with the above referenced X-1820 liner available from New Hampshire Ball Bearing made with HT-527 fabric (see line 42). This commercial bushing from New Hampshire Ball Bearing is identified and sold as AHJ08C012(L1). This commercial bushing is then compared to the wear results shown in line 44 to a bushing lined with the fabric liner described herein containing the 1BSRC shown in Table 1 and the 2SSRC shown in Table 2. Both lined bushings meet the test requirement of under 0.0045" wear at 100,000 cycles. However, as can be seen by line 44, the bearing liner herein made of the 1BSRC and 2SSRC indicated an advantage of about 30% lower wear.

Figure 13A:
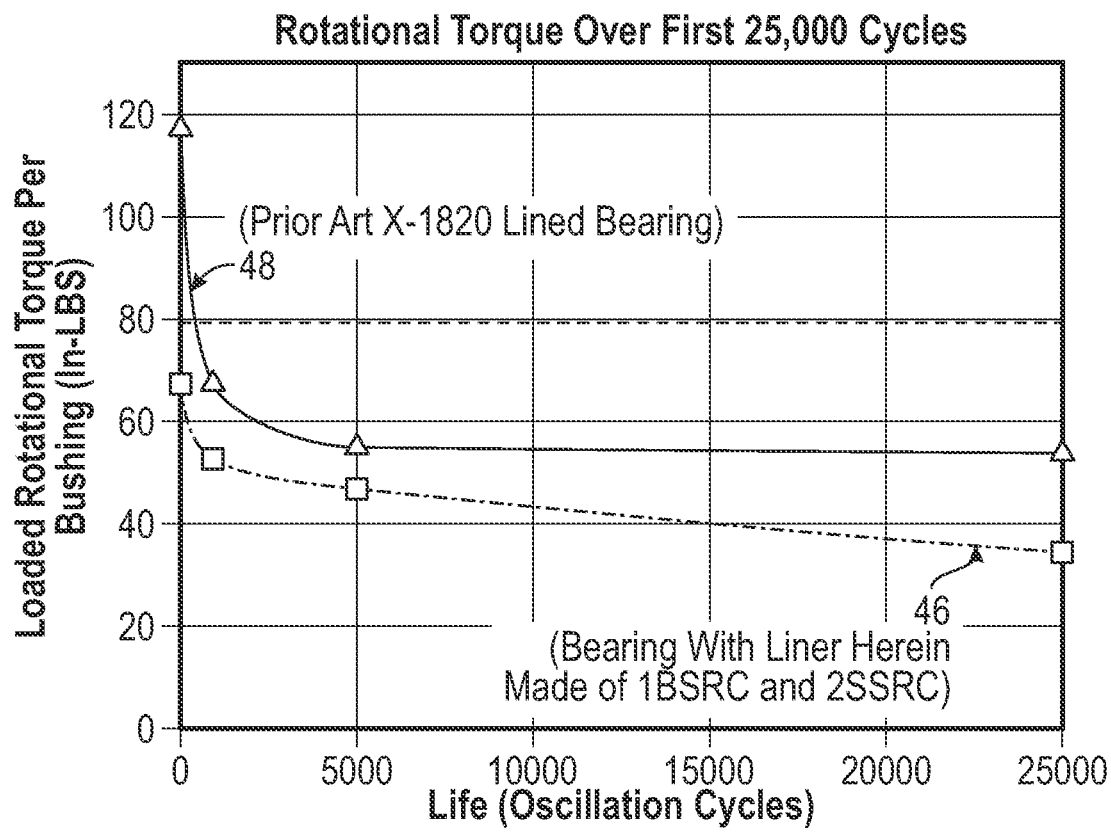
FIGS. 13A and 13B are plots of the rotational torque measured during the AS81934 bushing wear test of FIG. 12.
Figure 13B:
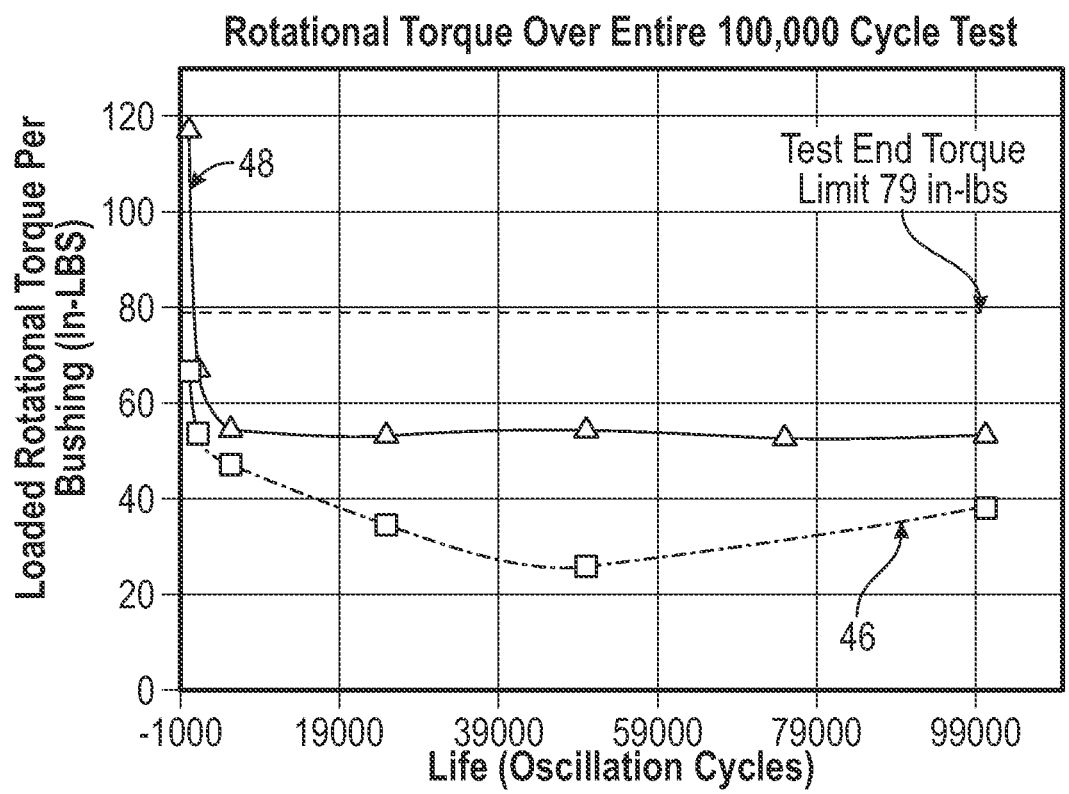

FIGS. 13A and 13B are plots of the rotational torque measured during the AS81934 bushing wear test of FIG. 12. FIG. 13A identifies the rotatational torque over the first 25,000 cycles, FIG. 13B identifies the rotatational torque over the entire 100,000 cycle test. As indcted at 46, the bearing liner herein made of the 1BSRC and 2SSRC produced a maximum torque of no greater than 67 in-lbs at zero cycles. This represents a remarkable 44% reduction in zero cycle torque versus the commercial X-1820 lined bearing (see line 48). Accordingly, it is contemplated herein that bearing liners made herein of a 1BSRC and a 2SSRC as described herein are bearing liners that in general can provide a maximum torque, at zero cycles, of less than or equal to 80 in-lbs, more preferably less than or equal to 70 in-lbs. The Mil Spec Test AS81934 requires the torque limit of 79 in-lbs not be exceeded at the end of the test. It was contemplated that this requirement is only applied at the end of the test evolved from the practical limitations of the prior art lined mil spec bearings which generally require a undesirable break in period when first put into service in order for the torque to drop below 79 in-lbs due to limitations of the prior art bearing liners. The above is considered even more significant since both the liners are made from the same base PTFE/Nylon containing fabric. Then, considering torque values measure starting at 1000 cycles), the liner made herein of a 1BSRC and a 2SSRC still has about a 34% reduction in operating torque for the life of the bearing relative to the X-1820 liner.

What is claimed is:

1. A method for preparing a bearing comprising:
   a. supplying a bearing having a first surface and second surface, wherein said first and second surfaces are configured to slide against one another;
   b. providing a bearing liner having a first bonding side and a second sliding side, wherein said bearing liner comprises woven or non-woven fabric having a thickness of 0.005 inches to 0.030 inches, a basis weight of 5.0 grams/ft$^2$ to 70 grams/ft$^2$ and an initial airflow permeability of 1 cfm to 100 cfm as measured by ASTM D737 (2018);
   c. applying a first bonding side resin composition containing polymerizable resin including glass and/or carbon fibers to said bonding side of said liner and partially polymerizing;
   d. applying a second sliding side resin composition containing polymerizable resin to said second sliding side of said bearing liner and partially polymerizing, wherein said second sliding side resin composition includes a lubricant at a level of 1.0% (wt.) to 60.0% (wt.);
   e. applying said first bonding side of said bearing liner containing partially polymerizable resin to one of said first or second surfaces of said bearing and bonding said first bonding side of said bearing liner to said first or second bearing surfaces.

2. The method of claim 1 wherein said lubricant comprises a mixture of polytetrafluoroethylene particulate and a perfluoropolyether of ether oil.

3. The method of claim 2 wherein said polytetrafluoroethylene particulate is present in said second sliding side resin composition at a level of 15.0% (wt.) to 22.0% (wt.) and said perfluoropolyether of ether oil is present in said sliding side resin composition at a level of 25.0% (wt.) to 33.0% (wt.).

4. The method of claim 1 wherein said glass and/or carbon fibers are present in said first bonding side resin composition at a level in the range of 2.0% (wt.) to 40.0% (wt.).

5. The method of claim 1 wherein steps (c) and (d) are done in sequence.

6. The method of claim 1 wherein said partial polymerization in steps (c) and (d) are initiated by exposure of said first bonding side resin composition and said second sliding side resin composition to UV light of: 0.1-0.5 J/cm$^2$ (UVA); 0.05-0.5 J/cm$^2$ (UVB); 0.010-00.100 J/cm$^2$ UVC; and 0.5-5.0 J/cm$^2$ (UVV).

7. The method of claim 1 wherein said polymerizable resin in said first bonding side resin composition provides a polyacrylate, phenolic resin, aromatic polyamide, epoxy resin, polyimide, poly(amide-imide), polyetherketone, polyetheretherketone, or polyester.

8. The method of claim 1 wherein said polymerizable resin in said second sliding side resin composition provides a polyacrylate, phenolic resin, aromatic polyamide, epoxy resin, polyimide, poly(amide-imide), polyetherketone, polyetheretherketone, or polyester.

9. The method of claim 1 wherein said polymerizable resin in said first bonding side resin composition comprises a polymer of a mixture of polymerized tris(2-hydroxyethyl) isocyanurate triacrylate monomer and polymerized trimethylolpropane triacrylate monomer.

10. The method of claim 1 wherein said polymerizable resin in said second sliding side resin composition comprises a polymer of a mixture of polymerized tris(2-hydroxyethyl) isocyanurate triacrylate monomer and polymerized trimethylolpropane triacrylate monomer.

11. The method of claim 1 wherein said bearing produces a maximum torque of no greater than 67 in-lbs at zero cycles in an AS81934 bushing wear test.

* * * * *

UNITED STATES PATENT AND TRADEMARK OFFICE
CERTIFICATE OF CORRECTION

PATENT NO. : 11,841,048 B1
APPLICATION NO. : 18/151111
DATED : December 12, 2023
INVENTOR(S) : Richard R. Soelch et al.

Page 1 of 1

It is certified that error appears in the above-identified patent and that said Letters Patent is hereby corrected as shown below:

In the Claims

In Column 12, Line 44, delete "of ether".

In Column 12, Line 48, delete "of ether".

Signed and Sealed this
Twelfth Day of August, 2025

Coke Morgan Stewart
*Acting Director of the United States Patent and Trademark Office*